(12) United States Patent
Cheng et al.

(10) Patent No.: US 11,477,056 B2
(45) Date of Patent: Oct. 18, 2022

(54) METHOD AND APPARATUS FOR CONTROLLING COMMUNICATION COMPENSATION, AND AIR CONDITIONER

(71) Applicants: QINGDAO HAIER AIR-CONDITIONING ELECTRONIC CO., LTD., Shandong (CN); HAIER SMART HOME CO., LTD., Shandong (CN)

(72) Inventors: Shaojiang Cheng, Shandong (CN); Defang Guo, Shandong (CN); Bin Shi, Shandong (CN); Baitian Zhuo, Shandong (CN); Ruigang Zhang, Shandong (CN)

(73) Assignees: QINGDAO HAIER AIR-CONDITIONING ELECTRONIC CO., LTD., Shandong (CN); HAIER SMART HOME CO., LTD., Shandong (CN)

(*) Notice: Subject to any disclaimer, the term of this patent is extended or adjusted under 35 U.S.C. 154(b) by 0 days.

(21) Appl. No.: 17/297,564

(22) PCT Filed: May 15, 2020

(86) PCT No.: PCT/CN2020/090430
§ 371 (c)(1),
(2) Date: May 27, 2021

(87) PCT Pub. No.: WO2020/238649
PCT Pub. Date: Dec. 3, 2020

(65) Prior Publication Data
US 2022/0021564 A1    Jan. 20, 2022

(30) Foreign Application Priority Data
May 31, 2019 (CN) .......................... 201910471255.9

(51) Int. Cl.
*H04B 7/216* (2006.01)
*H04L 25/03* (2006.01)
(Continued)

(52) U.S. Cl.
CPC .............. *H04L 25/03* (2013.01); *F24F 11/56* (2018.01); *F24F 11/64* (2018.01); *H04B 1/02* (2013.01); *H04B 7/216* (2013.01)

(58) Field of Classification Search
CPC . H04W 28/0215; H04W 4/026; H04W 24/00; H04W 52/0229; H04W 28/10;
(Continued)

(56) References Cited

U.S. PATENT DOCUMENTS

| | | | | |
|---|---|---|---|---|
| 7,342,984 B1* | 3/2008 | Yearsley | ............. | H04L 25/0262 375/225 |
| 9,729,362 B1* | 8/2017 | Ralph | ................. | H04L 27/0014 |

(Continued)

FOREIGN PATENT DOCUMENTS

| | | |
|---|---|---|
| CN | 1751487 | 3/2006 |
| CN | 101635694 | 1/2010 |

(Continued)

OTHER PUBLICATIONS

International Search Report from PCT/CN2020/090430 dated Jul. 30, 2020.
(Continued)

*Primary Examiner* — Eva Y Puente
(74) *Attorney, Agent, or Firm* — Calfee, Halter & Griswold LLP

(57) ABSTRACT

The present disclosure relates to a method for controlling communication compensation, comprising: determining a length class of a communication link according to a time length of pulse data transmitted on the communication link; and determining a compensation scheme for communication
(Continued)

S101 — Determining a length class of a communication link according to a time length of pulse data transmitted on the communication link S102 — Determining a compensation scheme for communication compensation according to the length class of the communication link compensation according to the length class of the communication link. In the invention, a length class of a communication link determined according to a time length of pulse data transmitted on the communication link is used to determine a compensation scheme for communication compensation so as to perform time compensation on data, thereby preventing attenuation caused by an excessively long communication distance, and improving the stability of long-distance communication performed by means of Homebus. Also disclosed are an apparatus for controlling communication compensation, and an air conditioner.

14 Claims, 2 Drawing Sheets

(51) Int. Cl.
  *F24F 11/64* (2018.01)
  *F24F 11/56* (2018.01)
  *H04B 1/02* (2006.01)
(58) Field of Classification Search
  CPC ......... H04W 52/0203; H04W 52/0212; H04W 52/0216; H04W 52/0219; H04W 56/001; H04W 72/005; H04W 72/12; H04W 72/1289; F24F 11/49; F24F 11/56; F24F 11/64; F24F 11/61; H04B 1/02; H04B 3/14; H04B 3/48

USPC ........................................................ 375/285
See application file for complete search history.

(56) References Cited

U.S. PATENT DOCUMENTS

| | | | |
|---|---|---|---|
| 2005/0111591 A1* | 5/2005 | Gregorius | ............... H04L 47/10 375/340 |
| 2017/0012654 A1* | 1/2017 | Lozhkin | ............. H04B 10/2575 |
| 2019/0154439 A1 | 5/2019 | Binder | |

FOREIGN PATENT DOCUMENTS

| | | |
|---|---|---|
| CN | 101980453 | 2/2011 |
| CN | 103023828 | 4/2013 |
| CN | 103703386 | 4/2014 |
| CN | 107480390 | 12/2017 |
| CN | 108344103 | 7/2018 |
| WO | 2016/138225 | 9/2016 |

OTHER PUBLICATIONS

Office action from Chinese Application No. 201910471255.9 dated Mar. 18, 2021.

* cited by examiner

METHOD AND APPARATUS FOR CONTROLLING COMMUNICATION COMPENSATION, AND AIR CONDITIONER

CROSS-REFERENCE TO RELATED APPLICATIONS

This application is the national stage entry of PCT/CN2020/090430, filed on May 15, 2020, which claims the priority to Chinese Patent Application No. 201910471255.9, filed on May 31, 2019, both of which are incorporated herein by reference in their entirety.

TECHNICAL FIELD

The present disclosure relates to the technical field of air conditioners, and more particularly, to a method and an apparatus for controlling communication compensation, and an air conditioner.

BACKGROUND

A multi-split air conditioning system includes an indoor unit and an outdoor unit, and information communication is usually performed between the outdoor unit and the indoor unit of the multi-split air conditioning system. At present, a single module of the outdoor unit of the multi-split air conditioning system can be connected to 32 indoor units, and then four modules in combination can be connected to 128 indoor units. In view of the development trend of the multi-split air conditioning system, the power of the outdoor unit may continue to increase and it can be connected to more than 128 indoor units. More connections to indoor units may result in a longer distance from the outdoor unit to the terminal indoor unit.

In the implementation of embodiments of the present disclosure, it has been found that the prior art is defective at least in the process of communication between the outdoor unit and the indoor unit through a Homebus (communication bus), where signals of the Homebus communication may suffer severe attenuation if the distance between the outdoor unit and the indoor unit of the multi-split air conditioning system is too long because signal refraction interference easily occurs in long-distance communication, as a result, the communication between the indoor unit and the outdoor unit of the multi-split air conditioning system may not be stable.

SUMMARY

A summary is provided to facilitate a basic understanding of some aspects of the disclosed embodiments. The summary is not a general overview, nor is it intended to identify key/critical elements or to define the scope of the embodiments, but rather as a prelude to the detailed description that follows.

A method and an apparatus for controlling communication compensation, and an outdoor unit of an air conditioner are provided herein to solve the problem of unstable communication caused by serious signal attenuation due to long communication distance in a Homebus communication process in the prior art.

In some embodiments, the method includes: determining a length class of a communication link according to a time length of pulse data transmitted on the communication link; and determining a compensation scheme for communication compensation according to the length class of the communication link.

In some embodiments, the apparatus includes: a length class determination module, configured to determine the length class of the communication link according to the time length of pulse data transmitted on the communication link; and a compensation module, configured to determine the compensation scheme for communication compensation according to the length class of the communication link.

In some embodiments, the outdoor unit of the air conditioner includes the apparatus for controlling communication compensation as described above.

The technical solution provided by the embodiments of the present disclosure is advantageous in that:

a length class of a communication link determined according to a time length of pulse data transmitted on the communication link is used to determine a compensation scheme for communication compensation so as to perform time compensation on data, thereby preventing attenuation caused by an excessively long communication distance, and improving the stability of long-distance communication performed by means of a homebus.

The foregoing summary and the following description are exemplary and explanatory only and are not limiting the invention.

BRIEF DESCRIPTION OF THE DRAWINGS

One or more embodiments are exemplified in the accompanying drawings, and such examples and drawings do not define the scope of the embodiments; like reference signs denote like elements throughout the drawings, and the drawings are not to scale, where.

REFERENCE SIGNS

401: Length class determination module; 402: Compensation module;
500: Processor; 501: Memory; 502: Communication interface; 503: Bus.

DETAILED DESCRIPTION

A detailed description of the implementation of the embodiments of the disclosure will be provided with reference to the accompanying drawings to facilitate a fuller and clearer understanding of features and technical aspects of the embodiments of the disclosure, and the drawings are included by way of illustration only and are not intended to limit the embodiments of the disclosure. In the following technical description, for an illustrative purpose, a plenty of details are set forth to provide a thorough understanding of the disclosed embodiments. However, one or more embodiments may be practiced without these such details. In other instances, well-known structures and devices may be simplified for brevity of the drawings.

Figure 1:
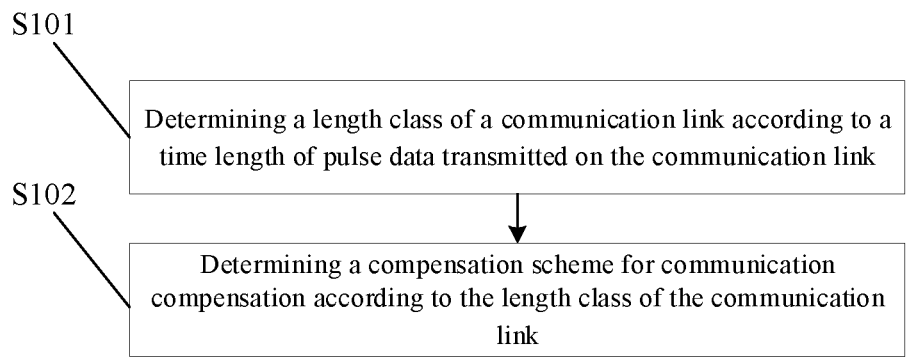
FIG. 1 is a first flowchart of a method for controlling communication compensation according to an embodiment of the present disclosure.

A method for controlling communication compensation is provided herein, as shown in FIG. 1, and includes:

S101, determining a length class of a communication link according to a time length of pulse data transmitted on the communication link; and S102, determining a compensation scheme for communication compensation according to the length class of the communication link.

In a long-distance communication of data, the signal of the data in the transmission is gradually attenuated due to power loss, and the signal is distorted when attenuated to a certain degree, which causes errors in reception; a signal attenuation degree is an important index to evaluate the quality of communication, and directly affects a relay distance in an arrangement of a transmission cable for communication. According to the solution provided herein, the length class of the communication link can be determined according to the time length of pulse data transmitted on the communication link, and the compensation scheme for communication compensation is determined according to the length class, so that the attenuation time can be automatically compensated according to a state of the signal without an external device, thereby improving the stability of long-distance communication.

Figure 2:
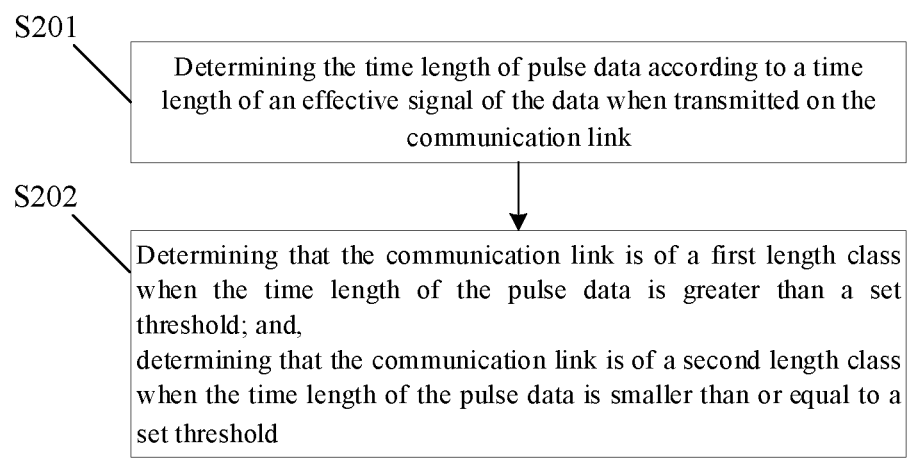
FIG. 2 is a second flowchart of the method for controlling communication compensation according to an embodiment of the present disclosure.

In some embodiments, as shown in FIG. 2, step S101 includes:

S201, determining the time length of the pulse data;

S202, determining that the communication link is of a first length class when the time length of pulse data is greater than a set threshold; and determining that the communication link is of a second length class when the time length of pulse data is smaller than or equal to a set threshold.

Herein, the time length of pulse data includes the time length of a high-level signal of the pulse; a length range of the communication link corresponding to the first length class is smaller than a length range of the communication link corresponding to the second length class.

Alternatively, a value of the set threshold has a corresponding relationship with a transmission speed of the communication link. Alternatively, the value of the set threshold is also related to margin design, and an additional margin time is provided for a range of values of the set threshold according to a margin requirement. Alternatively, the margin time has a value in a range of 8 us to 12 us.

Alternatively, if the communication link has a baud rate of 9600, i.e., 9600 bits transmitted per second, then it takes 104 us to transmit 1 bit; it is known that the high-level signal has a time length of at least 52 us, and if the time length of the high-level signal is less than 52 us, it's impossible to correctly detect the high-level signal of the data on the communication link. In a communication link, for example, with a baud rate of 9600, and when the margin time is 10 us, the value of the set threshold is 62 us.

Alternatively, in step S201, determining the time length of the pulse data specifically includes:

acquiring N high-level signals of the pulse data; and calculating an average value of the time lengths of the N high-level signals as the time length of the pulse data, where N is a natural number.

Alternatively, the N high-level signals may be consecutive or at intervals.

When entering a data pulse test mode, the indoor unit of the air conditioner starts to transmit data, and the data is received by the outdoor unit of the air conditioner through a communication link. After the outdoor unit receives the data, high-level signals in the pulse data are acquired and calculated to obtain an average value of the time lengths of the N high-level signals as the time length of the pulse data. Alternatively, N is a preset natural number. For example, ten high-level signals are acquired, the time lengths T of the ten high-level signals are calculated to obtain the average value $T_1$ of the time lengths of the high-level signals, and the length class of the communication link is determined according to the relation of $T_1$ with the set threshold.

According to the embodiment above, namely, if $T_1$ is longer than 62 us, it is then determined that the communication link is of a first length class; and if $T_1$ is shorter than 62 us, it is then determined that the communication link is of a second length class.

Herein, the length range of the communication link corresponding to the first length class is smaller than the length range of the communication link corresponding to the second length class.

In some embodiments, the length class of the communication link may also include more than two classes. For example, the first length class obtained according to the set threshold provided by the embodiment may be further divided into more length classes according to the transmission speed of the communication link so as to obtain more stable and reliable time points for detection.

Figure 3:
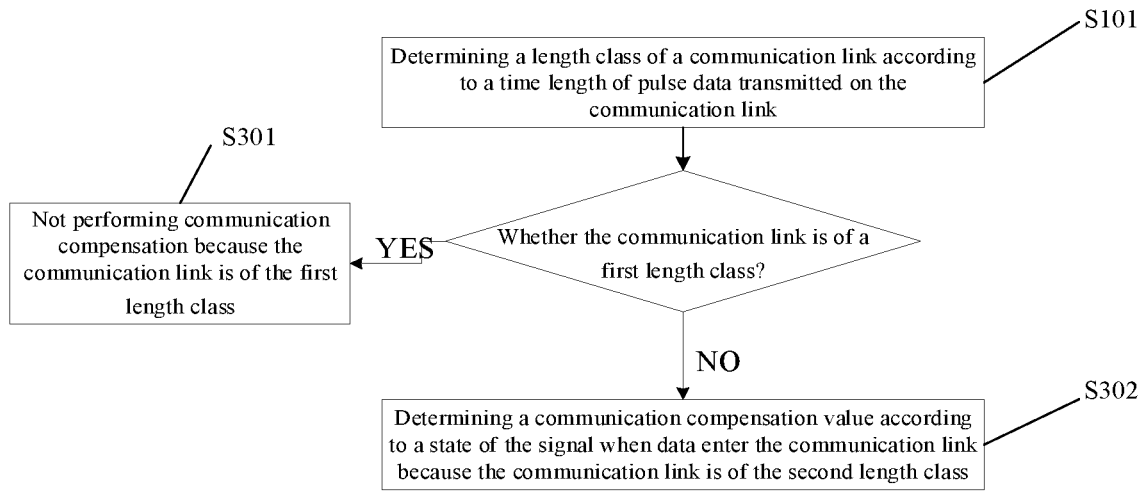
FIG. 3 is the second flowchart of the method for controlling communication compensation according to an embodiment of the present disclosure.

In some embodiments, as shown in FIG. 3, determining the compensation scheme for communication compensation according to the length class of the communication link in step S102 includes:

S301, not performing communication compensation if the communication link is of the first length class; and S302, determining a communication compensation value according to a state of the signal when data enter the communication link if the communication link is of the second length class.

If the communication link is of the first length class, then a corresponding length range of the communication link is short, and data can be normally communicated without compensation;

if the communication link is of the second length class, the corresponding length range of the communication link is long, the data may be attenuated, and the communication compensation value is determined according to the state of the signal when the data enter the communication link.

Alternatively, determining the communication compensation value according to the state of the signal when the data enter the communication link includes:

determining that the communication compensation value is 0 if a current signal is a low-level signal or a next signal is a high-level signal;

determining that the communication compensation value is a first time compensation value, and setting time compensation on a current high-level signal to increase the first time compensation value if the current signal is a high-level signal and the next signal is a low-level signal; and setting time compensation to reduce the first time compensation value when the next low-level signal is transmitted.

Alternatively, the first time compensation value is a time width for transmitting a one-bit high-level signal. Through communication compensation, a receiver can receive a complete data frame for detection, and errors in detection caused by signal attenuation are avoided.

According to the method for controlling communication compensation provided herein, a length class of a communication link can be determined according to a detected time length of pulse signals of data transmitted on the communication link, and a compensation scheme is devised to perform the communication time compensation for the data as necessary, so that a receiver can receive a complete data frame, the communication stability is improved, and the basic delay effect caused by long-distance data transmission is eliminated.

Figure 4:
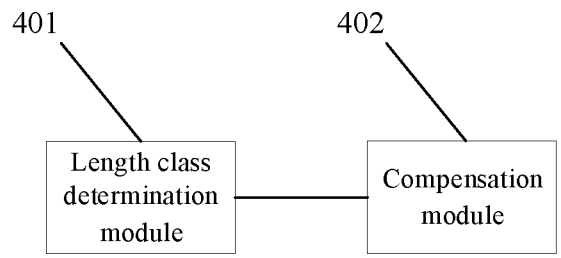
FIG. 4 is a schematic diagram of an apparatus for controlling communication compensation according to an embodiment of the present disclosure.

An apparatus for controlling communication compensation is provided herein, shown in FIG. 4, and includes:

a length class determination module 401, configured to determine a length class of a communication link according to a time length of pulse data transmitted on the communication link; and a compensation module 402, configured to determine a compensation scheme for communication compensation according to the length class of the communication link.

In some embodiments, the length class determination module 401 is configured to:

determine the time length of pulse data;

determine that the communication link is of a first length class when the time length of pulse data is greater than a set threshold; and determine that the communication link is of a second length class when the time length of pulse data is smaller than or equal to a set threshold;

wherein, the time length of pulse data includes the time length of a high-level signal of the pulse; a length range of the communication link corresponding to the first length class is smaller than a length range of the communication link corresponding to the second length class.

Alternatively, a value of the set threshold has a corresponding relationship with a transmission speed of the communication link. Alternatively, the value of the set threshold is also related to margin design, and an additional margin time is provided for a range of values of the set threshold according to a margin requirement. Alternatively, the margin time has a value in a range of 8 us to 12 us.

Alternatively, if the communication link has a baud rate of 9600, i.e., 9600 bits transmitted per second, then it takes 104 us to transmit 1 bit; it is known that the high-level signal has a time length of at least 52 us, and if the time length of the high-level signal is less than 52 us, it's impossible to correctly detect the high-level signal of the data on the communication link. In a communication link, for example, with a baud rate of 9600, and when the margin time is 10 us, the value of the set threshold is 62 us.

In some embodiments, the length class determination module 401 is configured to:

acquire N high-level signals of the pulse data; and calculate an average value of the time lengths of the N high-level signals as the time length of the pulse data, where N is a natural number.

When entering a data pulse test mode, the indoor unit of the air conditioner starts to transmit data, and the data is received by the outdoor unit of the air conditioner through a communication link. After the outdoor unit receives the data, high-level signals in the pulse data are acquired and calculated to obtain an average value of the time lengths of the N high-level signals as the time length of the pulse data. Alternatively, N is a preset natural number. For example, ten high-level signals are acquired, the time lengths T of the ten high-level signals are calculated to obtain the average value $T_1$ of the time lengths of the high-level signals, and the length class of the communication link is determined according to the relation of $T_1$ with the set threshold.

According to the embodiment above, namely, if $T_1$ is longer than 62 us, it is then determined that the communication link is of a first length class; and if $T_1$ is shorter than 62 us, it is then determined that the communication link is of a second length class.

Herein, the length range of the communication link corresponding to the first length class is smaller than the length range of the communication link corresponding to the second length class.

In some embodiments, the length class of the communication link may also include more than two classes. For example, the first length class obtained according to the set threshold provided by the embodiment may be further divided into more length classes according to the transmission speed of the communication link so as to obtain more stable and reliable time points for detection.

In some embodiments, the compensation module 402 is configured to:

not perform communication compensation if the communication link is of the first length class; and determine a communication compensation value according to a state of the signal when data enter the communication link if the communication link is of the second length class.

If the communication link is of the first length class, then a corresponding length range of the communication link is short, and data can be normally communicated without compensation;

if the communication link is of the second length class, the corresponding length range of the communication link is long, the data may be attenuated, and the communication compensation value is determined according to the state of the signal when the data enter the communication link.

Alternatively, the compensation module 402 is configured to:

determine that the compensation value is 0 if a current signal is a low-level signal or a next signal is a high-level signal;

determine that the communication compensation value is a first time compensation value, and setting time compensation on a current high-level signal to increase the first time compensation value if the current signal is a high-level signal and the next signal is a low-level signal; and set time compensation to reduce the first time compensation value when the next low-level signal is transmitted.

Alternatively, the first time compensation value is a time width for transmitting a one-bit high-level signal. Through communication compensation, a receiver can receive a complete data frame for detection, and errors in detection caused by signal attenuation are avoided.

According to the method for controlling communication compensation provided herein, a length class of a communication link can be determined according to a detected time length of pulse signals of data transmitted on the communication link, and a compensation scheme is devised to perform the communication time compensation for the data as necessary, so that a receiver can receive a complete data frame, the communication stability is improved, and the basic delay effect caused by long-distance data transmission is eliminated.

An air conditioner is provided herein and includes the apparatus for controlling communication compensation as described above.

A computer-readable storage medium is provided herein and stores computer-executable instructions configured to perform the method for controlling communication compensation as described above.

A computer program product is provided herein and includes a computer program stored on a computer-readable storage medium, the computer program including program instructions executable by a computer to cause the computer to perform the method for controlling communication compensation as described above.

The computer-readable storage medium may be a transient computer-readable storage medium or a non-transient computer-readable storage medium.

Figure 5:
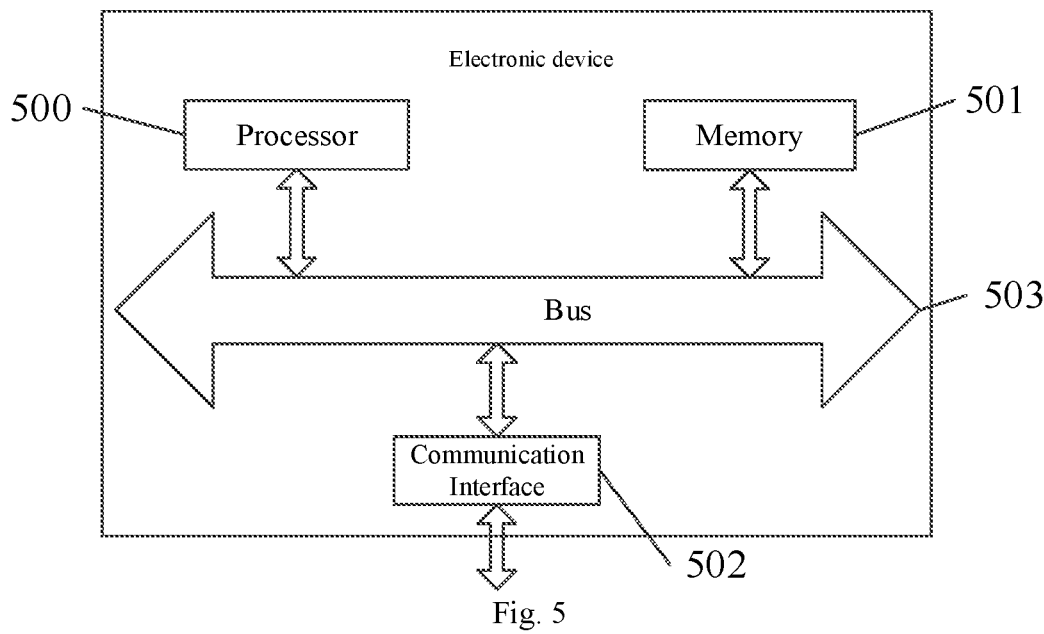
FIG. 5 is a schematic diagram of a structure of an electronic device according to an embodiment of the present disclosure.

An electronic device is provided herein, having a structure shown in FIG. 5, and includes:

at least one processor 500, exemplified in FIG. 5; a memory 501, and further a communication interface 502 and a bus 503. Herein, the processor 500, the communication interface 502, and the memory 501 may communicate with each other via the bus 503. The communication interface 502 may be used for information transmission. The processor 500 may invoke logic instructions in the memory 501 to perform the method for controlling communication compensation of the embodiments described above.

Further, the aforementioned logic instructions in the memory 501 may be stored in a computer-readable storage medium when implemented in the form of software functional units and sold or used as an independent product.

The memory 501 serves as a computer-readable storage medium for storing software programs and computer-executable programs such as program instructions/modules corresponding to the method in the disclosed embodiments. The processor 500 executes functional applications and processes data by running software programs, instructions and modules stored in the memory 501, i.e., implementing the method for controlling communication compensation described in the above embodiments.

The memory 501 may include a storage program partition and a storage data partition, wherein the storage program partition may store an operating system and an application program required for at least one function; the storage data partition may store data or the like created according to the use of the terminal device. Besides, the memory 501 may include a high-speed random access memory, and may also include a non-volatile memory.

The aspects of the disclosed embodiments may be embodied in the form of a software product stored in a storage medium including one or more instructions for causing a computer device, which may be a personal computer, a server, or a network device, etc., to perform all or part of the steps of the method described in the embodiments of the present disclosure. The storage medium can be a non-transient storage medium, including a variety of media capable of storing program codes, such as a USB flash disk, a mobile hard disk drive, a read-only memory (ROM), a random access memory (RAM), or a magnetic or optical disk; alternatively, the storage medium can be transient storage media.

The foregoing description and drawings illustrate embodiments of the present disclosure sufficiently to enable those skilled in the art to practice them. Other embodiments may include structural, logical, electrical, procedural, and other variations. These embodiments merely represent possible variations. Individual components and functions are optional unless explicitly required otherwise, and the order of operation may vary. Portions and features of some embodiments may be included in other embodiments or replace those of other embodiments. The scope of the embodiments of the present disclosure includes the entire scope of the claims, and all available equivalents thereof. As used herein, although the terms "first", "second", and the like may describe various elements, these elements should not be limited by these terms. These terms are only used to distinguish one element from another. For example, a first element may be referred to as a second element without changing the meaning of the description, and likewise, a second element may be referred to as a first element, so long as all occurrences of the "first element" are consistently renamed and all occurrences of the "second element" are consistently renamed. The first element and the second element are both elements, but may not be identical elements. Also, the wording herein is used for describing the embodiments only and is not intended to limit the claims. As used in the embodiments and the claims, the singular forms of "a", "an", and "the" are intended to include the plural forms as well, unless it's clearly indicated otherwise. Similarly, the term "and/or" as used herein is meant to encompass any and all possible combinations of one or more of the associated lists. Additionally, the terms "include" and "comprise", as well as variations thereof, i.e., "including" and/or "comprising", when used herein, refer to the presence of stated features, integers, steps, operations, elements, and/or components, but do not preclude presence or addition of one or more other features, integers, steps, operations, elements, components and/or groups. An element defined by the phrase "includes a . . . " does not, without more constraints, preclude the existence of additional identical elements in the process, method, or device that includes the element. Herein, it is noted that each embodiment differs from another embodiment in their emphases, and they share something in common as the reference for each other. For the method, the product, and the like disclosed in the embodiments, if they correspond to the method disclosed in the embodiments, reference may be made to the corresponding description of the method.

Those skilled in the art will appreciate that the various illustrative units and algorithm steps described in connection with the embodiments disclosed herein may be implemented as electronic hardware, or combinations of computer software and electronic hardware. Whether such functionality is implemented as hardware or software depends upon the particular application and design constraints imposed on the particular implementation. Those skilled in the art may implement the described functionality in varying ways for each particular application, but such an implementation should not be interpreted as causing a departure from the scope of the disclosed embodiments. It will be apparent to those skilled in the art that, for convenience and brevity of description, reference may be made to corresponding processes in the foregoing method embodiments for specific operation of the system, apparatus and unit described above, which will not be described in detail herein.

In the embodiments disclosed herein, the disclosed method, article of manufacture (including, but not limited to, apparatus, device, etc.) may be implemented otherwise. For example, the apparatus embodiments described above are merely illustrative, e.g., the partitioning of a unit may be only based on the logical function, and additional ways of partitioning may be possible in an actual implementation, doe example, multiple units or components may be combined or integrated into another system, or some features may be omitted or not performed. Besides, the couplings or direct couplings or communicative connections shown or discussed with respect to one another may be indirect couplings or communicative connections through some interface, device or unit, and may be electrical, mechanical or otherwise. The units described as separate components may or may not be physically separate, and the components shown as units may or may not be physical units, in other words, they may have a single location, or may be a plenty of units distributed over a network. Some or all of the units may be selected as necessary to implement the embodiments herein. Moreover, the functional units in the embodiments of the present disclosure may be integrated in one processing unit, may be separate physical units, or may be integrated with two or more units in one unit.

The flowcharts and block diagrams in the drawings illustrate the architecture, functionality, and operation of possible implementations of the system, method, and computer program product in accordance with embodiments of the present disclosure. In this regard, each block in the flowchart or block diagram may represent a module, a segment, or a portion of codes, which includes one or more executable instructions for implementing the specified logical function (s). In some alternative implementations, the functions noted in the blocks may take place in a different order from that noted in the drawings. For example, two successive blocks may in fact be executed substantially in parallel, and they may sometimes be executed in the reverse order, depending upon the functionality involved. In the description of the flowcharts and block diagrams in the drawings, the operations or steps corresponding to different blocks may also occur in a different order from that disclosed in the description, sometimes without a particular order between the different operations or steps. For example, two successive operations or steps may in fact be performed substantially in parallel, and they may sometimes be performed in the reverse order, depending on the functionality involved. Each block of the block diagrams and/or flowcharts, and combinations of blocks in the block diagrams and/or flowcharts, can be implemented by special purpose hardware-based systems which perform the specified functions or acts, or implemented by combinations of special purpose hardware and computer instructions.

What is claimed is:

1. A method for controlling communication compensation, comprising:
   determining a length class of a communication link according to a time length of pulse data transmitted on the communication link; and
   determining a compensation scheme for communication compensation according to the length class of the communication link;
   wherein the determining the length class of the communication link according to the time length of the pulse data transmitted on the communication link comprises:
   determining the time length of the pulse data;
   determining that the communication link is of a first length class when the time length of the pulse data is greater than a set threshold; and
   determining that the communication link is of a second length class when the time length of the pulse data is smaller than or equal to a set threshold;
   wherein, the time length of pulse data comprises the time length of a high-level signal of the pulse; a length range of the communication link corresponding to the first length class is smaller than the length range of the communication link corresponding to the second length class.

2. The method according to claim 1, wherein the determining the time length of the pulse data specifically comprises:
   acquiring N high-level signals of the pulse data; and
   calculating an average value of the time lengths of the N high-level signals as the time length of the pulse data, where N is a natural number.

3. The method according to claim 1, wherein the determining the compensation scheme for communication compensation according to the length class of the communication link comprises:
   not performing communication compensation if the communication link is of the first length class; and
   determining a communication compensation value according to a state of the signal when data enter the communication link if the communication link is of the second length class.

4. The method according to claim 3, wherein the determining the communication compensation value according to the state of the signal comprises:
   determining that the compensation value is 0 if a current signal is a low-level signal or a next signal is a high-level signal;
   determining that the communication compensation value is a first time compensation value, and setting time compensation on a current high-level signal to increase the first time compensation value if the current signal is a high-level signal and the next signal is a low-level signal; and setting time compensation to reduce the first time compensation value when the next low-level signal is transmitted.

5. An apparatus for controlling communication compensation, comprising:
   a length class determination module configured to determine a length class of a communication link according to a time length of pulse data transmitted on the communication link; and
   a compensation module configured to determine a compensation scheme for communication compensation according to the length class of the communication link;
   wherein the length class determination module is configured to:
   determine the time length of pulse data;
   determine that the communication link is of a first length class when the time length of pulse data is greater than a set threshold; and
   determine that the communication link is of a second length class when the time length of pulse data is smaller than or equal to a set threshold;
   wherein, the time length of pulse data comprises the time length of a high-level signal of the pulse; a length range of the communication link corresponding to the first length class is smaller than a length range of the communication link corresponding to the second length class.

6. The apparatus according to claim 5, wherein the length class determination module is configured to:
   acquire N high-level signals of the pulse data; and
   calculate an average value of the time lengths of the N high-level signals as the time length of the pulse data, where N is a natural number.

7. The apparatus according to claim 5, wherein the compensation module is configured to:
   not perform communication compensation if the communication link is of the first length class; and determine a communication compensation value according to a state of the signal when data enter the communication link if the communication link is of the second length class.

8. The apparatus according to claim 7, wherein the compensation module is configured to:
   determine that the compensation value is 0 if a current signal is a low-level signal or a next signal is a high-level signal;
   determine that the communication compensation value is a first time compensation value, and setting time compensation on a current high-level signal to increase the first time compensation value if the current signal is a high-level signal and the next signal is a low-level signal; and set time compensation to reduce the first time compensation value when the next low-level signal is transmitted.

9. An air conditioner, comprising the apparatus for controlling communication compensation according to claim 5.

10. The method according to claim 2, wherein the determining the compensation scheme for communication compensation according to the length class of the communication link comprises:
   not performing communication compensation if the communication link is of the first length class; and
   determining a communication compensation value according to a state of the signal when data enter the communication link if the communication link is of the second length class.

11. The method according to claim 10, wherein the determining the communication compensation value according to the state of the signal comprises:
   determining that the compensation value is 0 if a current signal is a low-level signal or a next signal is a high-level signal;
   determining that the communication compensation value is a first time compensation value, and setting time compensation on a current high-level signal to increase the first time compensation value if the current signal is a high-level signal and the next signal is a low-level signal; and setting time compensation to reduce the first time compensation value when the next low-level signal is transmitted.

12. The apparatus according to claim 6, wherein the compensation module is configured to:
   not perform communication compensation if the communication link is of the first length class; and
   determine a communication compensation value according to a state of the signal when data enter the communication link if the communication link is of the second length class.

13. The apparatus according to claim 12, wherein the compensation module is configured to:
   determine that the compensation value is 0 if a current signal is a low-level signal or a next signal is a high-level signal;
   determine that the communication compensation value is a first time compensation value, and setting time compensation on a current high-level signal to increase the first time compensation value if the current signal is a high-level signal and the next signal is a low-level signal; and set time compensation to reduce the first time compensation value when the next low-level signal is transmitted.

14. An air conditioner, comprising the apparatus for controlling communication compensation according to claim 13.

* * * * *